United States Patent [19]
Dalton et al.

[11] Patent Number: 6,138,193
[45] Date of Patent: Oct. 24, 2000

[54] SYSTEM FOR REDUCING NOISE IN BUS HAVING PLURALITY OF FIRST AND SECOND SET OF SIGNALS AND A DELAY DEVICE FOR DELAYING PROPAGATION OF SECOND SIGNALS

[75] Inventors: Scott W. Dalton, Tomball; Stephen D. Burleigh, Spring; Michael W. Edwards; Kenneth J. Haugen, both of Houston, all of Tex.

[73] Assignee: Compaq Computer Corporation, Houston, Tex.

[21] Appl. No.: 09/103,356

[22] Filed: Jun. 23, 1998

[51] Int. Cl.[7] ................................... G06F 13/00
[52] U.S. Cl. ..................... 710/102; 710/15; 710/100; 710/126
[58] Field of Search .................. 712/1; 710/16, 710/15, 129, 102, 126, 128, 100

[56] References Cited

U.S. PATENT DOCUMENTS

| | | | |
|---|---|---|---|
| 5,430,457 | 7/1995 | Zenda | 345/3 |
| 5,608,418 | 3/1997 | McNally | 345/3 |
| 5,608,883 | 3/1997 | Kando et al. | 710/129 |
| 5,787,307 | 7/1998 | Imoto | 710/16 |

OTHER PUBLICATIONS

Intel Corp., "AGP and 3D Graphics Software,"0 product information, downloaded from www., p. 11. 1996.

M. Brinton, Inel Corp., "Intel's New Advanced Graphics Port," article, downloaded from www., Sep. 30, 1997, p.2.

*Primary Examiner*—Meng-Ai T. An
*Assistant Examiner*—Mackly Monestime
*Attorney, Agent, or Firm*—Conley, Rose & Tayon, P.C.

[57] ABSTRACT

An apparatus supports both (1) a cost-effective graphics device (such as an AGP device) integrated onto the motherboard, and (2) an upgradable computer system with an add-in card slot for receiving a second graphics device (such as a second AGP device) on a card. The apparatus is connected to a bus that has a first set of signals which is sensitive to noise. The apparatus also has a first switch connected to a first device, the first switch being connected to the first set of signals on the bus. The apparatus has a second switch which is adapted to be connected to a second device. The second switch is also connected to the first set of signals on the bus. The apparatus also has a detector connected to the first and second switches to enable the first switch if the first device is selected and otherwise enable the second switch.

18 Claims, 3 Drawing Sheets

SYSTEM FOR REDUCING NOISE IN BUS HAVING PLURALITY OF FIRST AND SECOND SET OF SIGNALS AND A DELAY DEVICE FOR DELAYING PROPAGATION OF SECOND SIGNALS

BACKGROUND

The invention relates to a system for reducing noise on an add-in computer bus.

High resolution displays are typically driven by graphics controllers which may be located directly on computer motherboards to provide the best price/performance ratio or, alternatively, located on add-in boards such as video cards to provide expendability. The graphics controllers in turn are controlled by processors on the motherboards to provide a high resolution display capability. Typically, a first generation video card communicates with the processor via an Industry Standard Architecture (ISA) bus, while a newer video card may communicate with the processor via a faster Peripheral Component Interconnect (PCI) bus. However, even this improved data transfer rate is insufficient for certain graphical operations such as 3-D operations.

To improve the data transfer rate for graphic intensive operations, a new graphics bus known as an Advanced Graphic Port (AGP) bus has been specified. The AGP bus is more robust than the PCI bus since it is a bus which is dedicated to display operations. In contrast, the PCI bus shares its bandwidth with other devices connected to the PCI bus. Additionally, the AGP bus may double its bandwidth by transferring data on both rising and falling edges of the clock.

In addition to the faster clock speed and the dedicated graphics nature of the bus, the AGP bus increases its performance by providing an extra port for a graphics controller to access a shared system memory so that the controller can concurrently read texture information from a section of shared system memory while reading or writing Z-values and pixels from a local memory. Moreover, the AGP bus allows the computer's processor to write directly to the shared system memory when it needs to provide graphics data, commands or animated textures to the graphics device. These features increase the graphics display speed during a rendering of high resolution 3D scenes.

The AGP bus specifies a point-to-point bus which should only connect one AGP target device to one AGP master device. This restriction minimizes a degradation of the AGP bus signals as the AGP bus operates at a relatively high frequency. Many systems integrate AGP devices on their motherboards to optimize their price-performance ratio. However, a motherboard with both an integrated AGP device and an upgrade slot capable of receiving a second AGP device violates the point-to-point concept when the second AGP device is inserted into the upgrade slot. Thus, users can select from choices of (1) a cost-effective, but non-upgradable system with an AGP device integrated onto the motherboard, or (2) an upgradable computer system that incurs the extra cost associated with an AGP add-in board.

SUMMARY OF INVENTION

An apparatus supports both (1) a cost-effective graphics device (such as an AGP device) integrated onto the motherboard, and (2) an upgradable computer system with an add-in card slot for receiving a second graphics device (such as a second AGP device) on a card. The apparatus is connected to a bus that has a first set of signals which is sensitive to noise. The apparatus also has a first switch connected to a first device, the first switch being connected to the first set of signals on the bus. The apparatus has a second switch which is adapted to be connected to a second device. The second switch is also connected to the first set of signals on the bus. The apparatus also has a detector connected to the first and second switches to enable the first switch if the first device is selected and otherwise enable the second switch.

Implementations of the invention may include one or more of the following: the AGP device detector tests for the presence of the second device on the bus and if no second device is mounted on the bus, enables the first switch. Moreover, each switch routes a plurality of signals and each switch may be a field effect transistor (FET) switch. The bus may be an Advanced Graphics Port (AGP) where the sensitive set of signals include one or more address-data strobe signals, and a sideband strobe signal. Additionally, the remaining AGP signals are routed directly to the first and second AGP master devices. Further, the invention compensates for a propagation delay period associated with each of the first and second switches by delaying each signal in the second set of signals by the propagation delay period. Additionally, a free running clock generator supplies clock signals directly to each AGP device.

Advantages of the invention include the following: the invention allows an AGP master device to be integrated onto the computer system motherboard, yet allows the flexibility of an add-in slot without incurring degradations in the AGP bus signal integrity when the second AGP device is inserted into the upgrade slot. The invention avoids a stub effect caused by the introduction of the second AGP device into the upgrade slot which may cause noisy or erroneous signals on the bus. The invention also minimizes a capacitance load on the AGP bus when the second device is added to the computer system. The low capacitance loading reduces the bus signal distortion. Moreover, the invention reduces the potential for glitches on signals being transmitted over the AGP bus. Additionally, the invention is cost effective since it minimizes the number of switches required in order to support a plurality of devices on the AGP bus. Hence, the integrity and ultimately the functionality of the system are maintained in a flexible and cost-effective manner.

Other features and advantages will become apparent from the following description and from the claims.

DESCRIPTION

Figure 1:
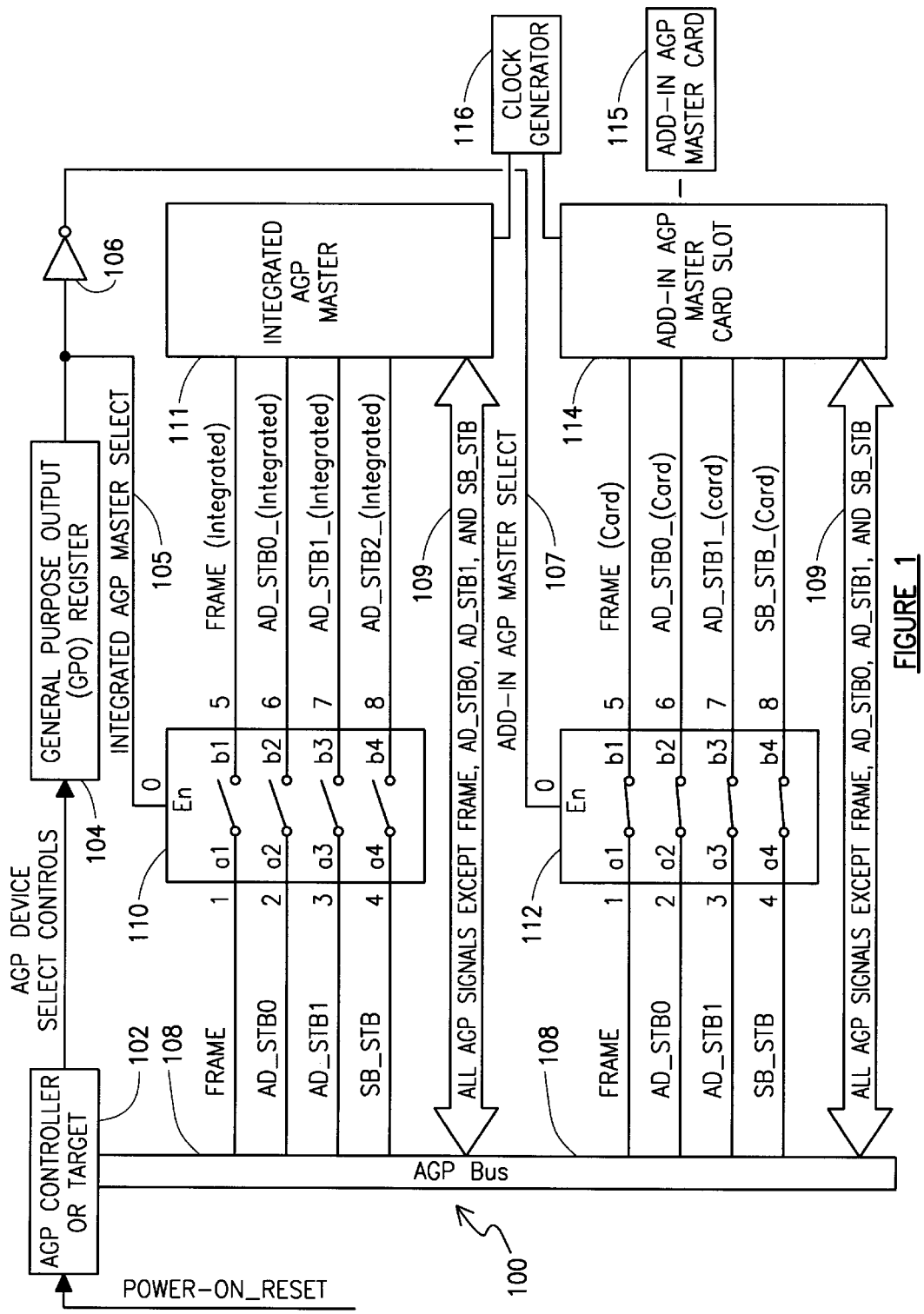
FIG. 1 is a schematic diagram of a circuit for handling AGP devices in a computer system.

Referring now to circuit 100 in FIG. 1, an AGP master device 111 which is integrated on a motherboard and add-in slot 114 which is adapted to receive a second AGP master device 115 on an AGP bus 108 is shown. The circuit 100 has an AGP target controller 102 which communicates with the integrated AGP master device 111 and the second AGP master device 115 in the add-in card slot 114. The AGP target controller 102 receives a Power_On_Reset signal from a computer system. The Power_On_Reset signal causes the AGP target controller 102 to be properly initiated when power is applied to the computer system. The AGP target controller 102 also drives signals on the AGP bus 108.

Based on a power-on device detection process which is illustrated in more detail in FIG. 2 and discussed later, the AGP target controller 102 generates an AGP master device select signal and provides this signal to a general purpose output (GPO) register 104. The GPO register 104 stores the AGP master device select signal which determines whether the integrated AGP master device 111 or add-in AGP master device card 115 is selected. When the output of GPO register 104 is asserted the integrated AGP master device 111 is selected. When the output of GPO register 104 is deasserted, the integrated AGP master device 111 is not selected, instead the second AGP master device 115 in the add-in card slot 114 via an inverter 106 is selected. The inverter 106 is connected to the output of the GPO register 104 to produce an inverted signal which allows the GPO register 104 to select only one of two AGP master devices at a time.

The outputs of the GPO register 104 and the inverter 106 are provided to switches 110 and 112, respectively. The integrated AGP master device 111 is connected to the AGP bus 108 via the switch 110 and also by the rest of the AGP bus 109. This switch 110 passes or blocks a first set of signals having four signals: FRAME, address data strobe zero (AD_STB0), address data strobe one (AD_STB1), and side-band strobe (SB_STB). The signal FRAME is used to enable the AGP master devices 111 or 115, while the remaining three strobe signals are more sensitive to noise than the other remaining signals of the AGP bus 108 and therefore require isolation via switches 110 and 112. The rest of the AGP bus signals forming a second set of signals 109 are connected directly to the integrated AGP master device 111. Similarly, a second AGP master device in slot 114 is connected to the AGP bus 108 via the second switch 112 and the second set of signals 109 which includes all AGP signals except the aforementioned four control signals. In this manner, the enabled switch 110 or 112 generate control signals FRAME, AD_STB0, AD_STB1 and SB_STB for the integrated AGP master device 111 or the second AGP master device 115 in the add-in slot 114, respectively.

Figure 2:
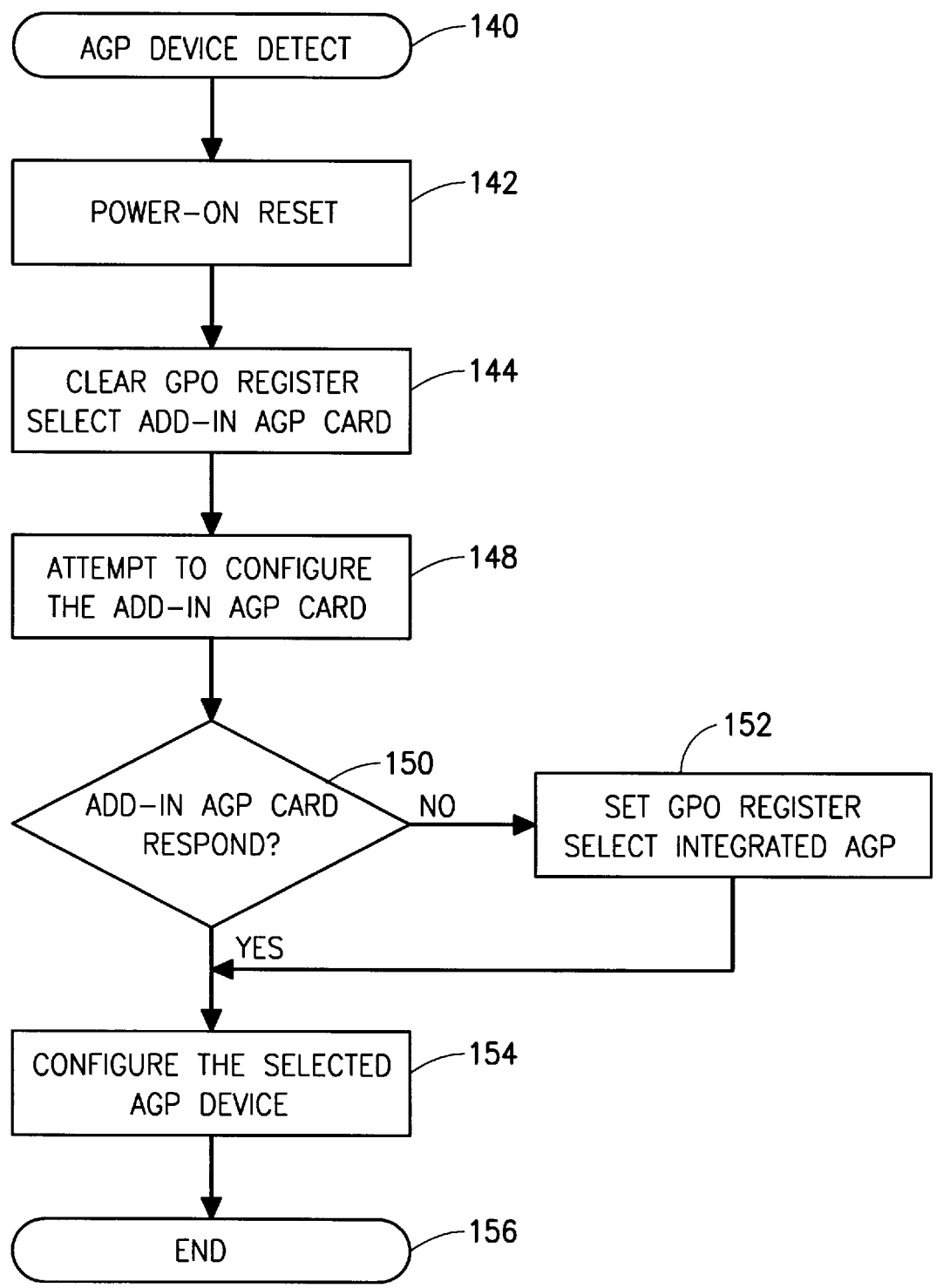
FIG. 2 is a flowchart of an AGP device detection and initialization process.

As part of a device determination process associated with FIG. 2, the target controller 102 determines whether the second AGP master device 115 has been inserted into the add-in slot 114, and if not, turns off the output of the inverter 106 to select the first switch 110 and to deselect the second switch 112. The deselection of the second switch 112 disables the frame and strobe signals going to the external AGP card slot 114, effectively disabling this add-in AGP card slot 114. Similarly, the selection of the switch 110 allows the frame and strobe signals to be connected to the first AGP device 111, effectively enabling the first AGP master device 111.

Correspondingly, if the controller 102 detects that a second AGP master device 115 has been inserted into the add-in slot 114, the target controller 102 leaves the GPO register 104 off so the first switch 110 remains deselected and the second switch 112 remains selected, effectively disabling the integrated AGP master device 111 on the motherboard.

Without the switches 110 and 112, signals between the controller 102, the integrated AGP master device 111 on the motherboard and the second AGP master device in slot 114 would experience signal reflections caused by the appearance of a stub effect when the second AGP master device is plugged into the slot 114. The switches 110 and 112 eliminate the stub effect on the AGP bus 108 by allowing signals to traverse only between two active devices on the AGP bus 108, that is, between the AGP target controller 102 and either the integrated AGP master device 111 or the AGP master device in slot 114.

To maintain signal integrity, the switches 110 and 112 are field effect transistor (FET) switches with a low on-state impedances and minimal propagation delays. These switches are not turned on and off dynamically. When the FET switches are configured after power on, a path is selected and for the remainder of the time the computer is on, signals travel through the selected path with a very small propagation delay. Further, even with the minimal propagation delay of switches 110 and 112, AGP signals 109 which are not propagating through the switches 110 and 112 need to be delayed by routing extra trace length on a printed circuit board to add propagation delays or by using delay lines to achieve the appropriate delay period, among others.

The circuit 100 is cost-effective in that it routes only noise sensitive signals through the switches 110 and 112, that is, the AGP strobe signals plus a non-sensitive signal FRAME. The alternative of routing all AGP signals through a plurality of switches would be cost prohibitive and would consume significant board area. The remaining data lines except for the clock line, are routed to both AGP master devices 111 and 114. Also, the integrity of clock signals to the AGP master devices 111 and 115 is provided by having separate outputs of a clock generator 116 independently clocking the integrated AGP master device 111 on the motherboard and the add-in AGP master device 115 via the add-in slot 114.

In this manner, the switches 110 and 112 ensure the integrity of various sensitive bus signals. The improved signal integrity reduces production and support issues associated with the computer system as a whole. Additionally, the use of electronic switches 110 and 112 enables the computer system to automatically detect and handle the presence or absence of the second AGP master device 115 on the add-in slot 114.

Referring now to FIG. 2, a flow chart illustrating an AGP master device detection and initialization process 140 is shown. In FIG. 2, the AGP target controller 102 is initially reset during a power-on reset sequence 142. After the power-on initialization sequence, the AGP controller 102 clears the GPO register 104 in step 144. At this stage, the input of the inverter 106 is low and the output of the inverter 106 goes high, enabling the switch 112 so that the AGP bus signals FRAME, AD_STB0, AD_STB1 and SB_STB are provided to the add-in slot 114.

Next, in step 148, the computer system attempts to configure the second AGP master device 115, if one is mounted in the slot 114. Following in step 150, the system detects whether an AGP master device 115 in slot 114 responds. If not, the second AGP master device 115 has not been installed and the AGP target controller 102 sets the GPO register 104 in step 152. This step causes the output of the inverter 106 to go low, thus disabling the control signals going to the add-on slot 114. Moreover, step 152 enables the switch 110 so that the FRAME, AD_STB0, AD_STB1 and SB_STB signals are provided to the integrated AGP master device 111 on the motherboard.

From step 150 or step 152, either the detected AGP master device 111 or 115 is configured in step 154. At this point, only a properly configured device will respond to bus cycles on the AGP bus 108. Subsequently, the computer system continues with its normal operation and the process of FIG. 2 completes its operation in step 156.

Figure 3:
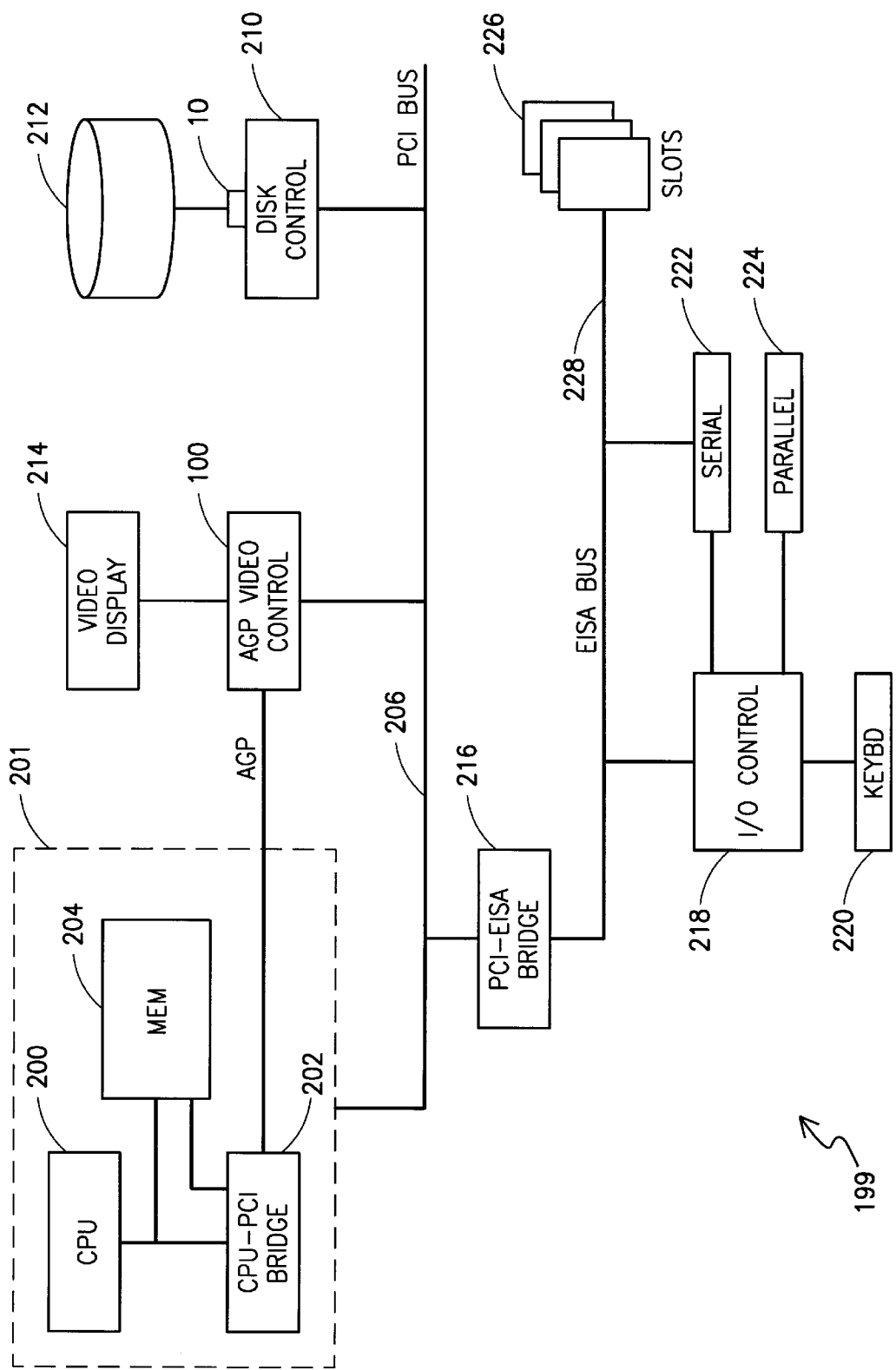
FIG. 3 is a block diagram of a computer system.

Referring to FIG. 3, a computer system 199 is illustrated. The system 199 includes a central processing unit (CPU) 200 connected by a CPU-PCI bridge 202 to a Peripheral Component Interconnect (PCI) bus 206. A main memory 204 is connected to the CPU 200 and CPU-PCI bridge 202.

A mass storage device 212, in the form of hard disk drives, for example, is connected to a SCSI controller 210 which in turn connected to the PCI bus 206. The AGP video controller 100 (shown in FIG. 1 and FIG. 3) communicates with the CPU-PCI bridge 202 and drives a video display 214.

An expansion bus 228, such as the Extended Industry Standard Architecture (EISA) or the Industry Standard Architecture (ISA) bus, is connected to the PCI bus 206 through a PCI-expansion bus bridge 216. The expansion bus 228 is connected to an input/output (I/O) controller 218, which provides interface ports to a keyboard 220, a pointer device (such as a mouse), and a serial port 222 and a parallel port 224. Expansion slots 226 are connected to the expansion bus 228 to provide further expansion capabilities.

Other embodiments are also within the scope of the following claims. For example, although a solid state switch has been used to minimize the effects of a stub created when more than one AGP master device is plugged into the AGP bus, other devices such as a relay or a manual switch or jumpers may be used. Also, the invention is applicable to other buses in place of the AGP bus.

What is claimed is:

1. Apparatus for reducing noise in a bus that has a first set of signals and a second set of signals wherein the first set of signals is sensitive to noise, said apparatus comprising:

a first switch connected to a first device and to the first set of signals on the bus;

a second switch adapted to connect to a second device and to the first set of signals on the bus;

a detector connected to enable the first switch if the first device is selected and otherwise to enable the second switch;

the second set of signals directly connected to the first and second devices; and a delay device adapted for delaying each signal in the second set of signals by a propagation delay period.

2. The apparatus of claim 1, wherein the detector tests for the presence of the second device on the bus and if no second device is connected to the bus, enables the first switch.

3. The apparatus of claim 1, wherein each of the switches comprises a field effect transistor (FET) switch.

4. The apparatus of claim 1, wherein the first set of signals comprises FRAME, address data strobe zero (AD_STB0), address data strobe one (AD_STB1), and side-band strobe (SB_STB) signals.

5. The apparatus of claim 4, wherein the first set of signals comprises strobe signals.

6. The apparatus of claim 1, wherein the bus comprises an Advanced Graphics Port (AGP).

7. The apparatus of claim 1, further comprising a clock generator coupled to the first and second devices.

8. The apparatus of claim 7, wherein the clock generator supplies separate clock signals to the first and second devices.

9. A method for reducing noise in a bus with a first set of signals and a second set of signals wherein the first set of signals is sensitive to noise, the first set of signals coupled to a first switch and a second switch, wherein the first switch is coupled to a first device and the second switch to a second device, the method comprising:

detecting whether the second device is connected to the bus; and if so, disabling the first switch and enabling the second switch;

transmitting the second set of signals to the first and second devices directly; and delaying each signal in the second set of signals by a propagation delay period.

10. The method of claim 9, further comprising testing for a presence of the second device on the bus and if no second device is mounted on the bus, enabling the first switch and disabling the second switch.

11. The method of claim 9, further comprising supplying independent clock signals to the first and second devices.

12. The method of claim 9, further comprising:

testing for the presence of the second device on the bus and if no second device is mounted on the bus, enabling the first switch and disabling the second switch; and supplying independent clock signals to the first and second devices.

13. The apparatus of claim 12, wherein each switching means is a FET switch.

14. The apparatus of claim 12, wherein each switching means routes FRAME, address data strobe zero (AD_STB0), address data strobe one (AD_STB1), and side-band strobe (SB_STB) signals.

15. The apparatus of claim 12, wherein said bus is an Advanced Graphics Ports (AGP).

16. An apparatus for reducing noise in a bus having a first set of signals and a second set of signals wherein the first set of signals is sensitive to the noise, the first set of signals coupled to the first and second switches, wherein the first switch is coupled to a first device and a second switch to a second device, comprising:

means for detecting whether the second device is connected to the bus;

means for switching the first set of signals to the first device if the second device is not connected to the bus;

means for switching the first set of signals to the second device if the second device is connected to the bus;

the second set of signals connected to the first and second devices directly; and means for delaying each signal in the second set of signals by a propagation delay period.

17. The apparatus of claim 16, wherein the detecting means further comprises means for detecting whether the first device is mounted on the bus and if the second device is not mounted on the bus, enabling the first switch.

18. A computer system, comprising:

a processor;

a display device coupled to said processor;

a memory array coupled to said processor; and a bus interface with a first set of signals and a second set of signals wherein the first set of signals is sensitive to noise, including:

first and second switches connected to the first set of signals on the bus;

a first device connected to the first switch;

a second device connected to the second switch;

a detector connected to the first and second switches, said detector enabling the first switch if the first device is selected and otherwise enabling the second switch;

the second set of signals connected to the first and second devices directly; and a delay device adapted for delaying each signal in the second set of signals by a propagation delay period.

* * * * *